United States Patent [19]

Crul

[11] Patent Number: 4,787,367
[45] Date of Patent: Nov. 29, 1988

[54] SOLAR COLLECTOR DEVICE

[75] Inventor: Bernardus A. Crul, Rijswijk, Netherlands

[73] Assignee: Tebodin, Advies- en Constructiebureau B.V., The Hague, Netherlands

[21] Appl. No.: 945,094
[22] PCT Filed: Mar. 26, 1986
[86] PCT No.: PCT/NL86/00009
 § 371 Date: Nov. 24, 1986
 § 102(e) Date: Nov. 24, 1986
[87] PCT Pub. No.: WO86/05862
 PCT Pub. Date: Oct. 9, 1986

[30] Foreign Application Priority Data

Mar. 26, 1985 [NL] Netherlands .......................... 8500886

[51] Int. Cl.[4] .............................................. F24J 2/04
[52] U.S. Cl. ..................... 126/437; 126/444; 126/450
[58] Field of Search ............... 126/426, 435, 437, 444, 126/445, 450, 415, 448, 438

[56] References Cited

U.S. PATENT DOCUMENTS

| 1,047,554 | 12/1912 | Nichols | 126/438 |
| 4,036,209 | 7/1977 | Press | 126/426 |
| 4,146,012 | 3/1979 | Elkins et al. | 126/426 |
| 4,182,308 | 1/1980 | Reynolds | 126/437 |
| 4,287,876 | 9/1981 | Jacques | 126/426 |
| 4,436,085 | 3/1984 | Larsen | 126/444 |

FOREIGN PATENT DOCUMENTS 2446366  8/1980  France.

Primary Examiner—James C. Yeung
Attorney, Agent, or Firm—Cushman, Darby & Cushman

[57] ABSTRACT

A solar collector device for the warming up of water, comprising a flat cylinder-shaped absorber element through which the water flows and made of temperature resistent black polymeric film material, on the sun-side a cover element of at least one transparent polymeric film and on the shadowside an insulation panel. In the black polymeric film of the absorber element spectral-selective absorption pigment is embedded and an inner film is used with a high impermeability for water and water vapor, which latter film is laminated with the black outer film to one integrated film. The absorber element is executed for a great length of many tens of meters. A water header having a weir device is provided at the outlet side of the absorber element and, below said header, a water collecting tank. The weir device has such a height with respect to the absorber element, that, in combination with the correct dimensioning of the water inlet and outlet openings, the absorber element operates with a water layer height of a few centimeters c.q. with a water velocity of a few centimeters per second.

5 Claims, 3 Drawing Sheets

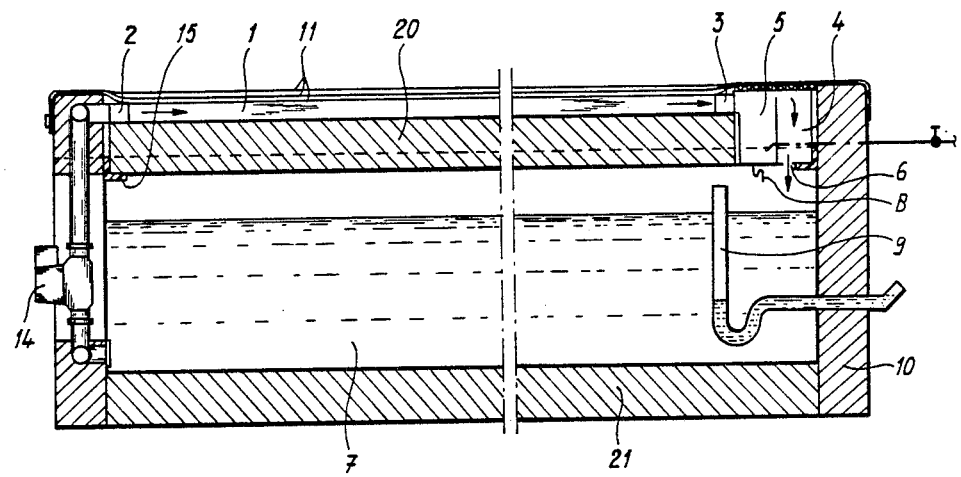
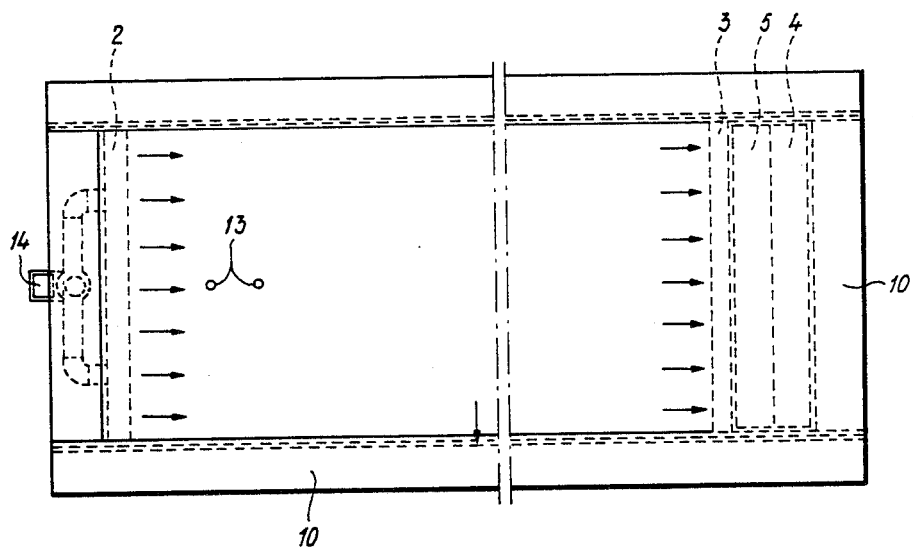

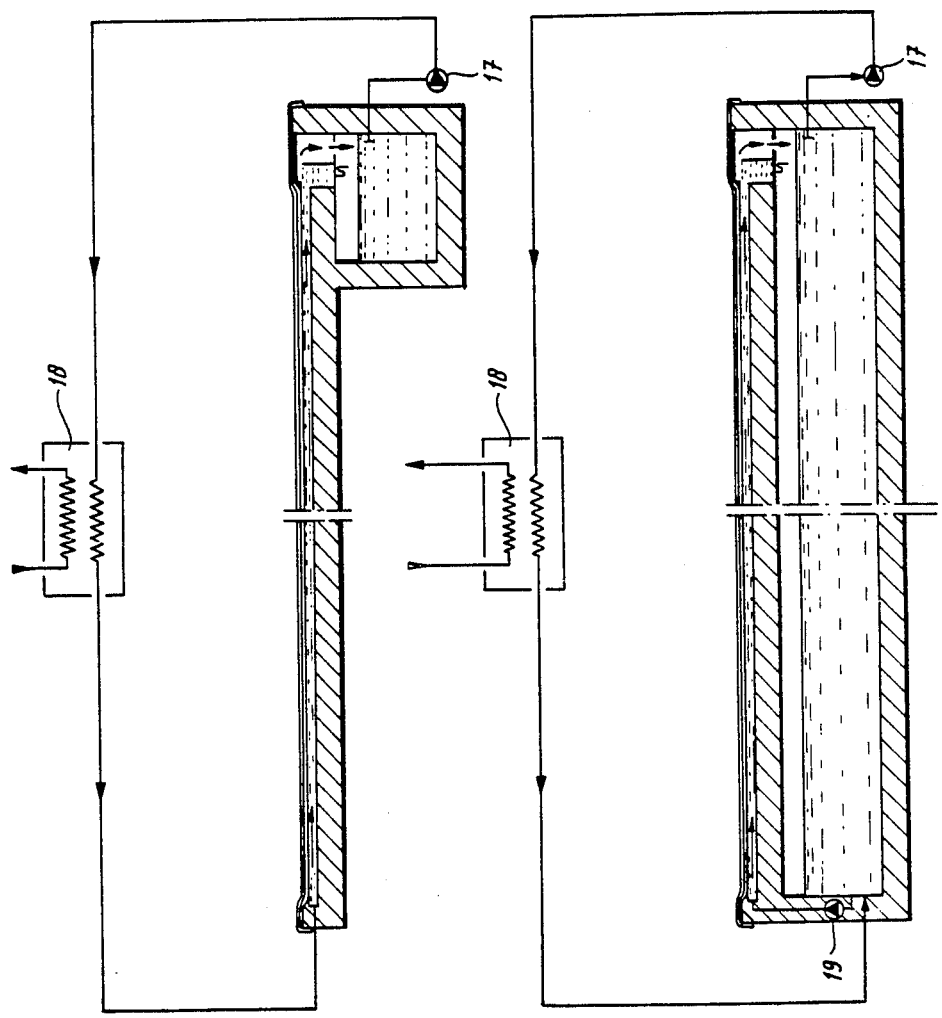

SOLAR COLLECTOR DEVICE

BACKGROUND OF THE INVENTION

The invention relates to a solar collector device for the warming up of water, comprising a flat cylinder-shaped absorber element through which the water flows and made of temperature resistent black polymeric film material, on the sunside a cover element of at least one transparant polymeric film and on the shadowside an insulation panel. Such a collector device is known from U.S. Pat. No. 4,036,209. This type of collector device however has a low efficiency and is normally also not suitable for water temperature up to 95° C.

With other known collector devices, designed to obtain a high efficiency, very often the absorber is embodied with extra provisions like fins and the like, in order to obtain the wanted heat transfer from the black absorber surface to the water to be warmed up. Apart from the cover elements often still made of glass and normally used to reduce the top losses of the absorber element, also a separate absorption coating is applied on the black absorber surface in order to reduce the reradiation (emission) from this surface. The investment costs of the above mentioned complicated solar collector devices, which are normally installed with an inclination angle, are high and because of the pressure differences concerned the costs for the water circulation through the absorber are not neglectable.

The invention has in view to solve the above mentioned problems and to provide a solar collector device, easily extendable over a large surface area, in which low costs and high efficiencies are combined.

With the solar collector device of the type, referred to in the beginning of this paper, this is achieved such that in the black polymeric film of the absorber element spectral-selective absorption pigment is embedded, and that an inner polymeric film is applied which has a high impermeability for water and water vapour, which latter film is composed in a laminate process with the black outer film to one integrated film. This inplementation gives the advantage that no separate spectral-selective absorption coating has to be applied on the outer surface of the absorber.

The inner film, preventing water vapour to escape from the absorber, can be made of metallised film.

The laminated absorber element can have a large length c.q. surface area, for which only in the longitudinal direction seals are needed as far as the absorber is not fabricated as an extruded cylinder. Because of the large wetted surface area of the absorber element also extra provisions like fins and the like for the heat transfer to the water are not needed.

With this new solar collector device, in which use is made of the flexible film material, the height of the water layer is determined by a water outlet header having a weir device of such a height with respect to the absorber element, that, in combination with the correct dimensioning of the water inlet and outlet openings, a water layer height of a few centimeters c.q. a water velocity of a few centimeters per second is obtained, which, maintaining with preference a turbulent flow, even with lengths of many tens of meters only creates a neglectable pressure difference across the absorber element.

On the shadowside the absorber element lies on an insulation panel.

From the water outlet header with weir device, mentioned earlier, the water is collected in an insulated collecting tank c.q. pump tank located just under the water outlet header. In those cases where a day/night storage is needed, this collecting tank can be extended under the full length of the insulation panel to a day/night storage tank, which can be incorporated simply in the integrated structure of absorber element, cover element and insulation panel.

The transparent cover element on the sunside of the absorber element consists of polymeric films, which in a simple fabrication process can be sealed in the longitudinal direction to one or more closed layer-shaped air space also of great length c.q. surface area. The closed space or spaces between the two or more transparant cover films is c.q. are filled up with a gas to the wanted layer thickness of a few centimeters for (further) reduction of the top losses of the absorber element. As said gas air, $CO_2$, or a combination of both can be used.

For circumstances like existing outside tropical area's where the solar radiation angle can be less than 60° with respect to the horizon, a reflection panel made of metallized polymeric film material can be applied in order to reflect the incoming solar radiation more rectangularly to the absorber element.

The investment costs per $m^2$ of this solar collector device are approximately fifty percent of the costs of the solar collector devices available at the moment for the warming up of water up to a temperature of 95° C. with a (similar) high efficiency.

BRIEF DESCRIPTION OF THE DRAWINGS

The invention will be elucidated on the basis of some embodiments with reference to the drawings, in which the same parts shown in the various figures are indicated with the same reference numbers, and in which:

The FIGS. 1A, 1B and 1C give a cross-section in the longitudinal direction, a cross-section in the cross-direction and a top view respectively of the solar collector device according to the invention in an embodiment having day/night storage; and The FIGS. 2 and 3 give a schematic diagram of the solar collector device according to the invention to a system without and with a day/night storage respectively.

DESCRIPTION OF THE PREFERRED EMBODIMENT

Figure 1B:
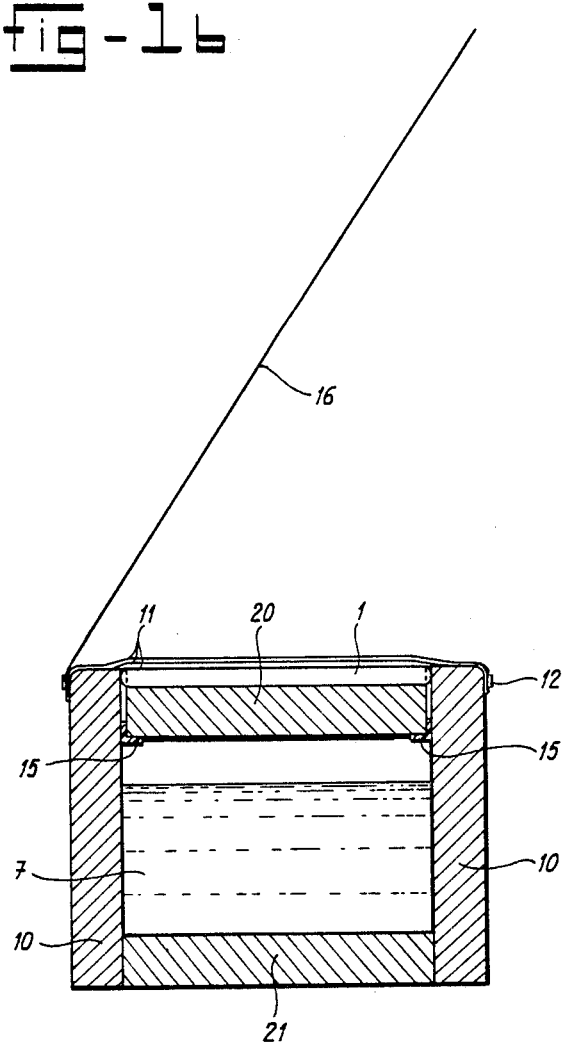

In FIGS. 1A, 1B and 1C various views are given of the integrated structure of the solar collector device according to the invention. In these figures are indicated with 1 the flat cylinder-shaped absorber element, with 11 the transparent cover element, with 20 the insulation panel and with 10 and 21 respectively the insulated walls and bottom of the water storage tank.

The absorber element 1 is placed on the insulation panel 20, which serves as a cover for the water storage tank, and is surrounded by the raised side walls 10. As mentioned before, the polymeric film of the absorber element has a laminated structure with a black outer film and with an inner film. The outer film is executed as an optimal absorption surface in which spectral-selective absorption pigment is embedded. The inner film is impermeable for water and/or water vapour and can be made of a metallized film.

The polymeric film material of the cylinder-shaped absorber element is tightened at the inlet side over a flat inletnipple 2 which is rounded off at both ends and at the outlet side over a similar outletnipple 3. Both nipples are executed with the required waterflow openings. The outletnipple 3 is tightened to a vapourtight executed outlet header 4, in which the weir device 5 is installed. In the bottom of the right part of the outlet header 4 openings 6 are made through which the water flows in the water storage tank 7, located beneath the header. In the left part of the outlet header a small emptying hole with syphon 8 is provided. This syphon prevents that during the nightly cooling down period the cool(er) air in the absorber element goes down into the water storage tank, bypassing the weir device, and replaces the warmer air present in said storage tank. The water storage tank 7 is provided with a syphon weir pot 9. The water storage tank is insulated not only on the upper side (by insulation panel 20) but also on the bottom and side walls (bottom 21 and walls 10).

The cover element 11 is formed by two or more polymeric cover films. The air spaces between the transparent films of the cover element are filled with air or another gas through the ventils 13. The cover element is stretched tightly over the absorber element and fixed at least at the longitudinal sides of the collector device with clampstrips 12 to the walls 10. This prevents that the absorber element becomes ball-shaped and contains air bubbles. The cover element functions as a rain and wind protection element as well.

In FIG. 1A a pump 14 is indicated with suction from the left part of the water storage tank and a discharge connection to the inletnipple of the absorber element. In the case of a day/night storage, as indicated in FIG. 1A, this pump provides for the watercirculation through the absorber element during day hours. During night hours this pump is stopped and the water content of the absorber element flows down into the water storage tank through the inlet- as well as through the outletnipple.

With this execution it is of importance that water vapour does not escape from the solar collector device, for which purpose the metallized inner film of the absorber element serves as well as (for the water storage tank) the tightening strips 15 and the syphon 9.

In FIG. 1B it is indicated in which way a reflection film is installed under an adjustable angle with the horizon, which reflection film is applied for a solar radiation under an angle less than approximately 60°.

In FIG. 2 a schematic diagram is given of the application of the solar collector device in a system without day/night storage. Pump 17 provides for the circulation of the water from the small water collecting tank through the heat exchanger 18 of the consumer system straight back into the absorber element.

In FIG. 3 a schematic diagram is given of the application of the solar collector device in a continuous system with day/night storage. Pump 17 provides for the circulation of the water from the right part of the water storage tank through the heat exchanger 18 of the consumer system back into the left part of the water storage tank. Pump 19 provides for the watercirculation of the water through the absorber element during day hours or hours of solar radiation.

In case that there are for instance eight solar radiation hours per day the capacity of pump 19 is chosen three times the capacity of pump 17. With the correct dimensioning c.q. height of the water storage tank the extra heat needed for the night hours will be stored in the storage tank during day hours.

I claim:

1. A solar collector for warming up of water comprising:
    a flat cylinder-shaped absorber, through which water flows, having an integrated film including:
    an inner film being substantially impermeable for water and water vapor; and
    a temperature resistant, black polymeric outer film being laminated on said inner film so that said outer film has an embedded spectral-selective absorption pigment;
    a cover, disposed on a sunside of said absorber, including at least one transparent polymeric film; and
    an insulation panel, disposed on a shadowside of said absorber;
    wherein said absorber further comprises:
    first and second opposed ends;
    a water inlet at said first end;
    a water outlet at said second end; and
    said solar collector further comprises:
    a water inlet header and a water outlet header, on which said inlet and said outlet of said absorber are fixed respectively, said outlet header having a weir device; and
    a water collecting tank, located below said outlet header, whereby said weir device is at such a height with respect to said absorber, and said inlet and outlet openings are of such dimension, that said absorber operates with a water layer height of a few centimeters casu quo with a water velocity of a few centimeters per second.

2. A solar collector as in claim 1, wherein said weir device is at such a height with respect to said absorber and said inlet and outlet openings are of such dimension, that a flow in said absorber creates no more than a negligible pressure difference across said absorber.

3. A solar collector as in claim 1, wherein said water collecting tank is insulated on a bottom side, a first side wall, and a second side wall, and said tank extends under a full surface of said insulation panel to form an integrated structure with said panel, so that said water collecting tank acts as a water storage tank for day/night storage.

4. A solar collector as in claim 1, wherein said inner film is made of metallized film so that said inner film acts as a substrate for said spectral-selective absorption pigment.

5. A solar collector as in claim 1, wherein said flat cylinder-shaped absorber is fabricated as an extruded cylinder.

* * * * *